United States Patent
Yagihashi

(10) Patent No.: US 8,948,140 B2
(45) Date of Patent: Feb. 3, 2015

(54) W-CDMA COMMUNICATION SYSTEM AND METHOD OF CONTROLLING CQI TRANSMISSION CYCLE

(75) Inventor: Ayumu Yagihashi, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 998 days.

(21) Appl. No.: 12/438,779

(22) PCT Filed: Aug. 29, 2007

(86) PCT No.: PCT/JP2007/067239
§ 371 (c)(1),
(2), (4) Date: Feb. 25, 2009

(87) PCT Pub. No.: WO2008/026762
PCT Pub. Date: Mar. 6, 2008

(65) Prior Publication Data
US 2009/0316662 A1   Dec. 24, 2009

(30) Foreign Application Priority Data
Aug. 31, 2006 (JP) .................................. 2006-235687

(51) Int. Cl.
*H04B 7/216* (2006.01)
*H04L 1/00* (2006.01)
*H04L 1/18* (2006.01)

(52) U.S. Cl.
CPC ............ *H04L 1/0027* (2013.01); *H04L 1/0026* (2013.01); *H04L 1/1854* (2013.01)
USPC ........................... 370/335; 370/252; 455/450

(58) Field of Classification Search
None
See application file for complete search history.

(56) References Cited

U.S. PATENT DOCUMENTS

| 6,993,294 B2 * | 1/2006 | Nobukiyo et al. ......... 455/67.11 |
| 2006/0148507 A1 | 7/2006 | Liljestrom et al. |
| 2007/0047502 A1 * | 3/2007 | Marinier et al. .............. 370/335 |
| 2008/0081635 A1 * | 4/2008 | Jonsson .................... 455/452.2 |

FOREIGN PATENT DOCUMENTS

| EP | 1 304 900 A2 | 4/2003 |
| JP | 03199173 A | 7/2003 |
| JP | 2004134898 A | 4/2004 |
| JP | 2004147050 A | 5/2004 |
| JP | 2005175945 A | 6/2005 |
| JP | 2005521360 A | 7/2005 |

(Continued)

OTHER PUBLICATIONS

International Search Report for PCT/JP2007/067239 mailed Dec. 18, 2007.

(Continued)

*Primary Examiner* — Mohammad Adhami
(74) *Attorney, Agent, or Firm* — Sughrue Mion, PLLC

(57) ABSTRACT

A base station (20) and a mobile station (10) preliminarily register a transmission cycle of a CQI associated with every free space, in which channelization codes are not defined in a channelization code set of an HS-SCCH. In the case of setting of the transmission cycle of the CQI, the base station (20) transmits identification information of the free spaces associated with the transmission cycle to be set up to the mobile station (10) by the HS-SCCH. When the identification information of the free space is received by the HS-SCCH, the mobile station (10) transmits the CQI to the base station (20) at the transmission cycle associated with the free space.

14 Claims, 11 Drawing Sheets

(56) References Cited

FOREIGN PATENT DOCUMENTS

| WO | 2004077871 A | 9/2004 |
|---|---|---|
| WO | 2005079095 A | 8/2005 |
| WO | 2006/072665 A1 | 7/2006 |
| WO | 2007/024780 A2 | 3/2007 |

OTHER PUBLICATIONS

3GPP TS 25.331 V5.12.0 (Mar. 2005),Section 10.3.6.40a.
The Extended European Search Report for EP 07 806 694.1 dated on Feb. 28, 2013.

* cited by examiner

FIG. 4

CODE OFFSET INDICATOR (4 BITS)

| CODE GROUP INDICATOR (3 BITS) | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 000 | 1,1 | 1,2 | 1,3 | 1,4 | 1,5 | 1,6 | 1,7 | 1,8 | 1,9 | 1,10 | 1,11 | 1,12 | 1,13 | 1,14 | 1,15 | 15,1 |
| 001 | 2,1 | 2,2 | 2,3 | 2,4 | 2,5 | 2,6 | 2,7 | 2,8 | 2,9 | 2,10 | 2,11 | 2,12 | 2,13 | 2,14 | 14,15 | 14,1 |
| 010 | 3,1 | 3,2 | 3,3 | 3,4 | 3,5 | 3,6 | 3,7 | 3,8 | 3,9 | 3,10 | 3,11 | 3,12 | 3,13 | 13,14 | 13,15 | 13,1 |
| 011 | 4,1 | 4,2 | 4,3 | 4,4 | 4,5 | 4,6 | 4,7 | 4,8 | 4,9 | 4,10 | 4,11 | 4,12 | 12,13 | 12,14 | 12,15 | 12,1 |
| 100 | 5,1 | 5,2 | 5,3 | 5,4 | 5,5 | 5,6 | 5,7 | 5,8 | 5,9 | 5,10 | 5,11 | 11,12 | 11,13 | 11,14 | 11,15 | 11,1 |
| 101 | 6,1 | 6,2 | 6,3 | 6,4 | 6,5 | 6,6 | 6,7 | 6,8 | 6,9 | 6,10 | 10,11 | 10,12 | 10,13 | 10,14 | 10,15 | 10,1 |
| 110 | 7,1 | 7,2 | 7,3 | 7,4 | 7,5 | 7,6 | 7,7 | 7,8 | 7,9 | 9,10 | 9,11 | 9,12 | 9,13 | 9,14 | 9,15 | 9,1 |
| 111 | 1,1 | 2,2 | 3,3 | 4,4 | 5,5 | 6,6 | 7,7 | 8,8 | 8,9 | 8,10 | 8,11 | 8,12 | 8,13 | 8,14 | 8,15 | 8,1 | a — MULTICODE NUMBER
b — CODE OFFSET OF SPREADING FACTORS 16

W-CDMA COMMUNICATION SYSTEM AND METHOD OF CONTROLLING CQI TRANSMISSION CYCLE

TECHNICAL FIELD

The present invention relates to a W-CDMA (Wide band Code Division Multiple Access) communication system for controlling a transmission cycle of a CQI (Channel Quality Indicator) to be regularly transmitted from a mobile station to a base station, and a method of controlling a CQI transmission cycle.

BACKGROUND ART

In a W-CDMA communication system in conformity with 3GPP (3rd Generation Partnership Project), which is caused to become the standard currently, HSDPA (High Speed Downlink Packet Access) is proposed as a technique to achieve a high-speed downlink.

As shown in FIG. 1, a W-CDMA communication system comprises a mobile station and a base station. In the HSDPA, the base station transmits packet data to the mobile station by an HS-PDSCH (High Speed Physical Downlink Shared Channel). Further, before transmitting the packet data by the HS-PDSCH, the base station transmits control information (packet control information) used for demodulation and decoding of the packet data to the mobile station by an HS-SCCH (High Speed Shared Control Channel). The control information (packet control information) includes information on channelization codes (a multicode number indicating the number of channelization codes assigned to one mobile station and a code offset indicating an offset value of a channelization code).

As a characteristic function of the HSDPA, there is a function that the mobile station calculates a status of a propagation path, which changes minute by minute, as an index value of a CQI, maps the calculated CQI on an HS-DPCCH (High Speed Dedicated Physical Control Channel), and regularly transmits it to the base station.

Thus, inasmuch as the base station can grasp the latest status of the propagation path, it is possible to obtain a merit that a transmission rate of the HS-PDSCH can be optimized in a time unit of two milliseconds of the shortest period, which is a subframe. Further, by optimization of the transmission rate of the HS-PDSCH, it is possible to obtain a merit that a channel resource of the HS-PDSCH can be used effectively.

Techniques regarding the CQI are disclosed in various Patent Documents. For example, International Publication No. 2004/077871 pamphlet (hereinafter, referred to as "Patent Document 1") discloses a base station and a terminal (mobile station) that can achieve reduction of collision of cycle information transmitted from the terminal (mobile station) to the base station, and restrain interference of communication as much as possible. In Patent Document 1, the base station includes a receiving section for receiving quality information (CQI) indicating a current communication state, which is periodically transmitted from the terminal (mobile station) to the base station, and a cycle processing section for calculating and adding a time offset variable with respect to reception timing of the quality information. Further, the terminal (mobile station) includes a transmitting section for transmitting the quality information (CQI), and a cycle processing section for calculating and adding a time offset variable with respect to transmission timing of the quality information.

Patent Document 1 is one that discloses a technical idea to achieve reduction of collision of a CQI (cycle information) regularly transmitted from a mobile station to a base station by shifting transmission/reception timing of the CQI. Therefore, Patent Document 1 fails to disclose control for stopping or starting transmission of the CQI itself, and has no description that suggests it.

Further, Japanese Patent Application Publication No. 2004-134898 (corresponding to U.S. Patent Application Publication No. 2005/0174982) (hereinafter, referred to as "Patent Document 2") discloses a technical idea to carry out the optimum scheduling according to data of each mobile station in an up line. In Patent Document 2, a mobile station comprises a buffer for storing transmission data, a CQI generating section for generating a CQI according to communication quality, and a transmission control section for controlling a transmission interval for transmitting the CQI in accordance with one of the amount of transmission data stored in the buffer and a value related to the transmission data. A base station comprises a CQI extracting section for extracting a CQI from reception data, an observing section for observing the number of reception slots of the CQI, a scheduler for carrying out scheduling on the basis of the CQI extracted by the CQI extracting section and the number of reception slots in a predetermined period of time, and a data generating section for generating transmission data with scheduling in this scheduler.

This Patent Document 2 discloses a technical idea to control a transmission interval for transmitting the CQI in accordance with the amount of transmission data stored in the buffer. However, in Patent Document 2, it is not considered whether or not the base station carries out transmission to the mobile station when the transmission interval of the CQI is controlled.

Japanese Patent Application Publication No. 2004-147050 (corresponding to U.S. Patent Application Publication No. 2004/0127221) (hereinafter, referred to as "Patent Document 3") discloses a mobile communication system capable of reducing delay of packet transmission effectively. In Patent Document 3, the mobile communication system comprises a base station and a mobile station. A radio link is set up between the base station and the mobile station. A packet is transmitted from the base station to the mobile station using the radio link. The base station comprises a base station transmitting and receiving section for setting up a radio link in the mobile station, a base station state updating section for generating transmission and reception state updating information indicating a packet receivable state in the mobile station and for notifying this transmission and reception state updating information to the base station, and a base station memory section for continuously holding individual physical channel setting information in the radio link at a suspended state. The mobile station comprises a mobile station transmitting and receiving section for setting up a radio link in the base station, a mobile station state updating section for setting up one of an active state in which reception of a packet is possible and a suspended state in which reception of a packet is impossible on the basis of transmission and reception state updating information, and a base station memory section for continuously holding individual physical channel setting information in the radio link at the suspended state.

Patent Document 3 merely discloses a technical idea to notify the transmission and reception state updating information from the base station to the mobile station using the HS-SCCH (High Speed Shared Control Channel). Patent Document 3 fails to disclose a technique to control a transmission cycle of a CQI, and has no description that suggests it.

The transmission cycle of the CQI is defined in TS25.331 of 3GPP. According to the TS25.331, the base station specifies any of 0, 2, 4, 8, 10, 20, 40, 80 and 160 (unit is milliseconds) as a transmission cycle of a CQI against the mobile station before starting communication of HSDPA.

Generally, the base station makes a transmission cycle longer in the case where it is determined that a propagation path status at this time is stable. It makes the transmission cycle shorter in the case where it is determined that it is unstable. Further, once this transmission cycle is set up in the mobile station, it is used until it is reset up. In the case where it is to be reset up, it is necessary to carry out a setting process using an upper layer against the mobile station.

Now, as shown in FIG. 1, in the base station, there is a period when transmission of packet data by the HS-PDSCH is not carried out. In FIG. 1, subframes shown with half-tone dot meshing indicate that the base station does not carry out transmission by the HS-SCCH and the HS-PDSCH for the mobile station.

However, inasmuch as the transmission cycle of the CQI is regular as described above (in FIG. 1, two milliseconds), there is possibility that the mobile station continues transmission of the HS-DPCCH in which the CQI is mapped even in a period when the base station does not carry out transmission of the HS-PDSCH.

Inasmuch as the transmission of the CQI is unnecessary except for the time when packet data are received by the HS-PDSCH, transmission of the CQI mapped on the HS-DPCCH except for the time when packet data are received by the HS-PDSCH becomes a long process. The longer a period when transmission of packet data by the HS-PDSCH from the base station is not carried out is, the more remarkable this long process becomes.

On the other hand, Japanese Patent Application Publication No. 2003-199173 (corresponding to U.S. Pat. No. 6,993,294) (hereinafter, referred to as "Patent Document 4") discloses a mobile communication system that can reduce power consumption of a mobile station, reduce interference wave power of an up line and increase capacity of the up line. In Patent Document 4, a base station sets up an upward control channel with the mobile station to transmit a pilot signal. The mobile station measures reception quality of this pilot signal, and transmits quality information (CQI) to the base station using an upward quality control channel (HS-DPCCH: High Speed-Dedicated Physical Control Channel). The base station carries out transmission control of data to the mobile station using this quality information (CQI). The mobile station is set up so as to carry out transmission start and stop control of the quality information, and the quality information is transmitted only if needed.

Patent Document 4 discloses a technical idea to control transmission of the quality information (CQI) from the mobile station to the base station only if needed. In order to achieve this, transmission start and stop control of the quality information (CQI) are carried out during setting of the upward quality control channel (HS-DPCCH) in the mobile station. To be explained in detail, in Patent Document 4, in order to stop transmission of the quality information (CQI), the base station carries out notification of termination of data transmission to the mobile station using an individual channel DL DPCH (Dedicated Physical Channel), the mobile station determines whether final packet data are received or not, or the base station determines whether off of a Request Indicator to be transmitted is received for the predetermined number of times or not. In any case, in Patent Document 4, it is required to use the individual channel, or carry out complicated determination in the mobile station.

DISCLOSURE OF THE INVENTION

It is therefore an exemplary object of the present invention to provide a W-CDMA communication system and a method of controlling a CQI transmission cycle capable of stopping transmission of a CQI using an HS-SCCH except for the time when packet data are received by an HS-PDSCH in a mobile station.

In order to achieve the above object, in a W-CDMA communication system according to an exemplary aspect of the present invention comprising a base station and a mobile station that transmits a CQI to the base station at a transmission cycle set up by the base station, the base station and the mobile station have CQI transmission cycle registering means for preliminarily registering the transmission cycle of the CQI associated with every free space, in which channelization codes are not defined in a channelization code set of an HS-SCCH; the base station has identification information transmitting means for transmitting, in the case of setting of a transmission cycle of the CQI, identification information on the free space associated with the transmission cycle to be set up to the mobile station by the HS-SCCH; and the mobile station has identification information receiving means for receiving the identification information of the free space by the HS-SCCH, and CQI transmitting means for transmitting the CQI to the base station at the transmission cycle associated with the free space.

In order to achieve the above object, a method of controlling a CQI transmission cycle according to an exemplary aspect of the present invention is a method of controlling a CQI transmission cycle by a base station and a mobile station that transmits a CQI to the base station at a transmission cycle set up by the base station, wherein the base station and the mobile station have a registering step of preliminarily registering a transmission cycle of the CQI associated with every free space, in which channelization codes are not defined in a channelization code set of an HS-SCCH; the base station has a CQI transmission cycle setting step of transmitting, in the case of setting of a transmission cycle of the CQI, identification information of the free space associated with the transmission cycle to be set up to the mobile station by the HS-SCCH; and the mobile station has a CQI transmission step of transmitting, when the identification information of the free space is received by the HS-SCCH, the CQI to the base station at the transmission cycle associated with the free space.

BRIEF DESCRIPTION OF THE DRAWINGS

FIG. 4 is a view for explaining that labels are assigned to the free spaces in the channelization code set of the HS-SCCH;

BEST MODE FOR CARRYING OUT THE INVENTION

Hereinafter, an embodiment for implementing the present invention will be described with reference to the drawings.

Figure 1:
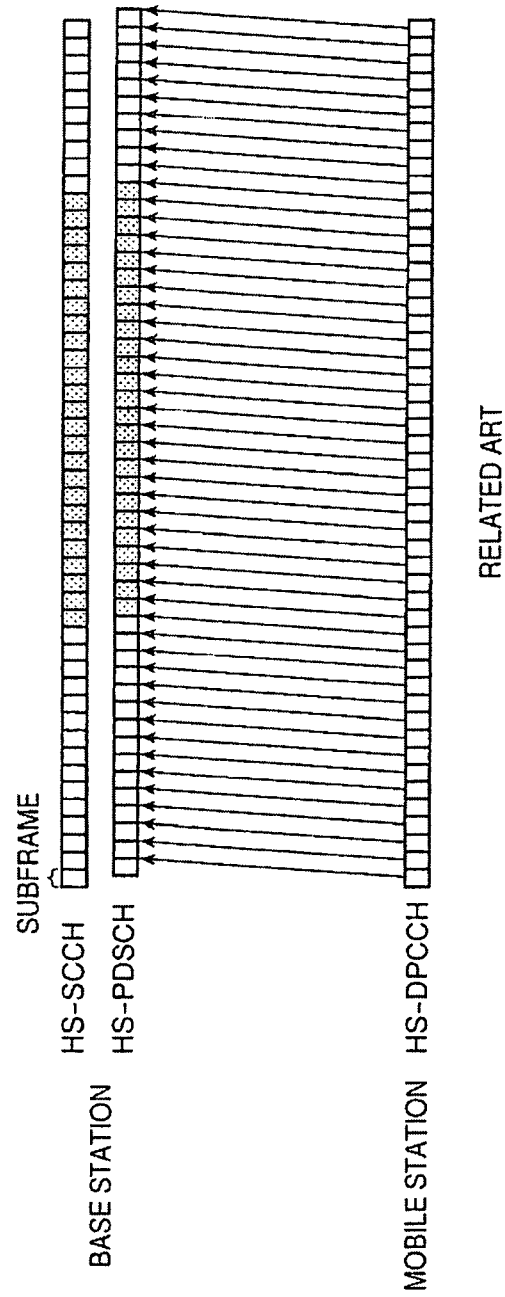
FIG. 1 is a view showing a transmission status of each channel in a W-CDMA communication system according to the related art.
Figure 2:
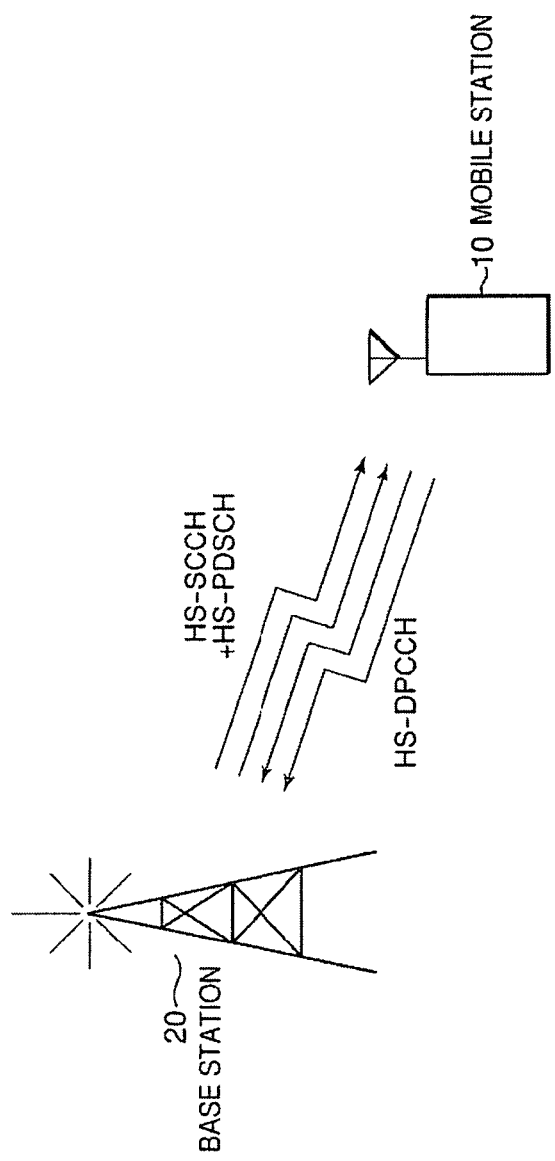
FIG. 2 is a view showing a configuration of a W-CDMA communication system according to one embodiment of the present invention.

As shown in FIG. 2, a W-CDMA communication system according to a typical embodiment of the present invention comprises a mobile station 10 and a base station 20. In this regard, although one mobile station 10 and one base station 20 are respectively shown in FIG. 2 for the sake of convenience of explanation, a plurality of mobile stations 10 and a plurality of base stations 20 are provided in practice.

A radio link is set up between the mobile station 10 and the base station 20. In the radio link, a line from the mobile station 10 to the base station 20 is called an up line (uplink), while a line from the base station 20 to the mobile station 10 is called a down line (downlink). HSDPA (High Speed Downlink Packet Access) has an HS-DPCCH (High Speed Dedicated Physical Control Channel) as an up line (uplink) and an HS-SCCH (High Speed Shared Control Channel) and an HS-PDSCH (High Speed Physical Downlink Shared Channel) as down lines (downlink).

The HS-PDSCH is used for transmitting packet data from the base station 20 to the mobile station 10. By being temporally shared with a plurality of base stations (time-sharing), it is possible to share one HS-PDSCH. The HS-SCCH is used for transmitting packet control information (control information used for demodulation and decoding of packet data) from the base station 20 to the mobile station 10. The HS-DPCCH is an individual channel for transmitting a CQI (Channel Quality Indicator) determined from a quality measured result of a CPICH (Common Pilot Channel) and ACK (Acknowledgment)/NACK (Negative Acknowledgement), which is message confirming information on the received packet, from the mobile station 10 to the base station 20.

The mobile station 10 maps a CQI, which becomes an index of a status of a propagation path, on the HS-DPCCH at a transmission cycle set up by the base station 20, and transmits it to the base station 20.

The base station 20 optimizes a transmission rate of the HS-PDSCH on the basis of the CQI received from the mobile station 10, and then transmits packet data to the mobile station 10 by the HS-PDSCH.

Further, the base station 20 transmits control information (packet control information) used for demodulation and decoding of the packet data to the mobile station 10 by the HS-SCCH before the packet data are transmitted by the HS-PDSCH. In this control information, as described above, information on the channelization code is included.

In this regard, a subframe of the HS-SCCH is provided so as to become a pair with a subframe of the HS-PDSCH immediately before that, and the control information (packet control information) used for demodulation and decoding of the packet data to be transmitted with the subframe of the HS-PDSCH to become the pair is transmitted.

Figure 3:
FIG. 3 is a view for explaining that free spaces exist in a channelization code set of an HS-SCCH.

In 3GPP (3rd Generation Partnership Project), as shown in FIG. 3, a channelization code set (Channelisation Code set) of the HS-SCCH is defined.

The base station 20 transmits, as information on a channelization code, identification information (information with total seven bits consisting of three bits of a code group and four bits of a code offset) of a region in which the channelization code is defined to the mobile station 10 by the HS-SCCH. This causes a multicode number of the channelization code and a code offset of the channelization code when a spreading factor (SF: Spreading Factor) is sixteen from the base station 20 to the mobile station 10 to be notified.

For example, in FIG. 3, it is assumed that a multicode number of a channelization code is "5", and a code offset is "5". In this case, the base station 20 transmits information with total seven bits consisting of a code group "100" and a code offset "0100" as identification information of the region in which the channelization code is defined to the mobile station 10 by the HS-SCCH.

The mobile station 10 determines that the multicode number of the channelization code is "5" and the code offset is "5" on the basis of the identification information received from the base station 20. The mobile station 10 then carries out decoding and demodulation of packet data to be transmitted by the HS-PDSCH using the channelization code.

Now, in the channelization code set of the HS-SCCH, as shown in FIG. 3, free spaces in each of which a channelization code is not defined exist.

Then, in the present embodiment, by focusing free spaces in a channelization code set of the HS-SCCH, the base station 20 carries out setting of a transmission cycle of a CQI for the mobile station 10 using the free spaces.

Specifically, as shown in FIG. 4, labels 1 to 8 are preliminarily respectively assigned into free spaces in a channelization code set of the HS-SCCH, and transmission cycles of a CQI are associated with the respective labels 1 to 8. Association between the labels and the CQI transmission cycles is preliminarily registered in both the base station 20 and the mobile station 10. In the case where a transmission cycle of a CQI is set up, the base station 20 transmits, to the mobile station 10 by the HS-SCCH, identification information of a free space into which a label associated with the transmission cycle to be set up is assigned.

For example, in FIG. 4, a label "1" is assigned into a free space with a code group "111" and a code offset "0000", and is associated with a transmission cycle "0 milliseconds" of the CQI. Further, a label "2" is assigned into a free space with a code group "111" and a code offset "0001", and is associated with a transmission cycle "two milliseconds" of the CQI.

Figure 5:
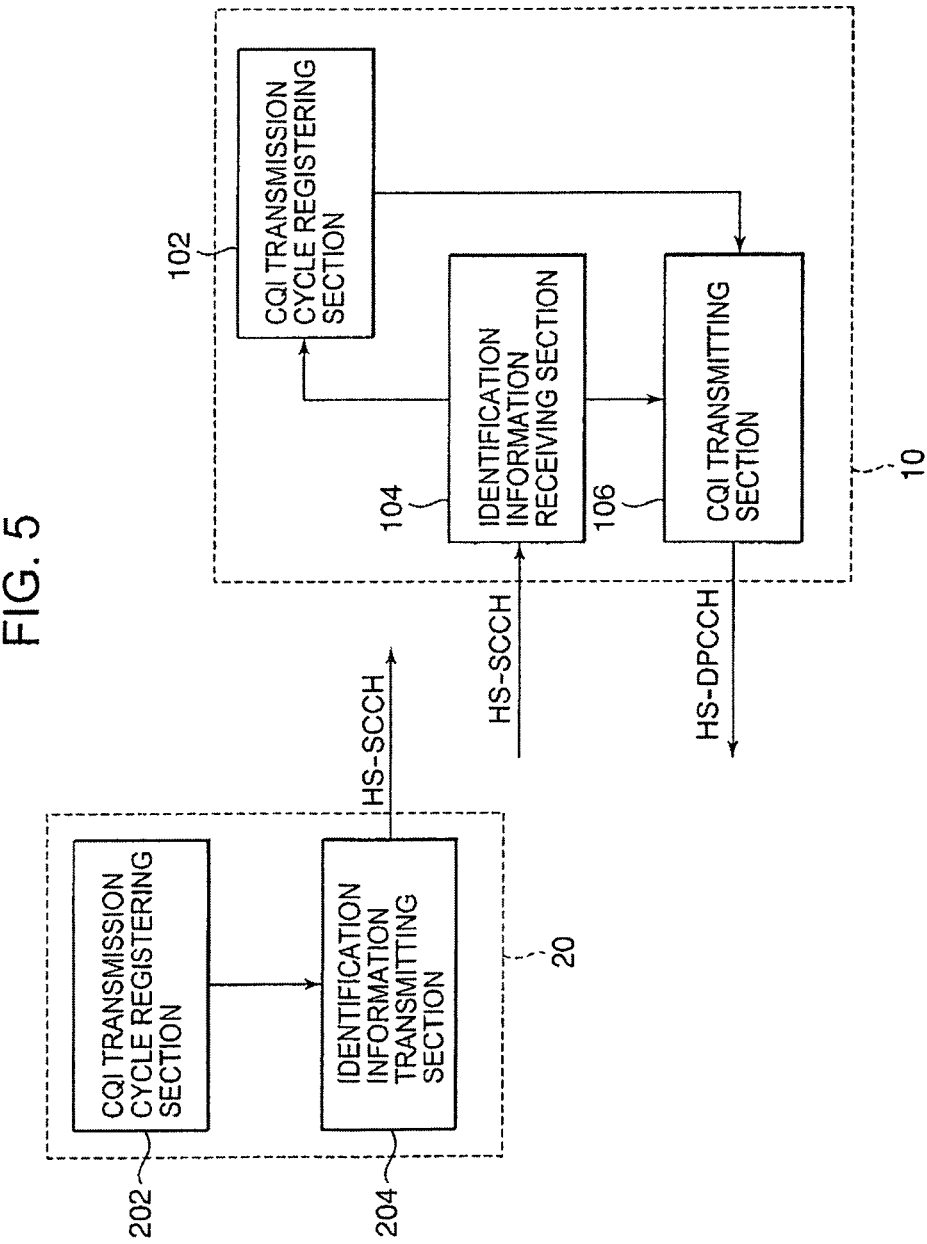
FIG. 5 is a block diagram showing a configuration of a base station and a mobile station used in the W-CDMA communication system shown in FIG. 2.

FIG. 5 shows a configuration of the base station 20 and the mobile station 10 used in the W-CDMA communication system shown in FIG. 2.

The base station 20 comprises a base station CQI transmission cycle registering section 202 and an identification information transmitting section 204. The base station CQI transmission cycle registering section 202 preliminarily registers transmission cycles of CQIs respectively associated with free spaces in each of which a channelization code in a channelization code set of the HS-SCCH is not defined (association table between labels and CQI transmission cycles). In the case where a transmission cycle of a CQI is set up, the identification information transmitting section 204 transmits identification information on the free space associated with the transmission cycle to be set up to the mobile station 10 by the HS-SCCH by referring to the base station CQI transmission cycle registering section 202.

The mobile station 10 comprises a mobile station CQI transmission cycle registering section 102, an identification information receiving section 104, and a CQI transmitting section 106. The mobile station CQI transmission cycle registering section 102 preliminarily registers the transmission cycles of the CQI respectively associated with the free spaces in each of which a channelization code in the channelization code set of the HS-SCCH is not defined (the association table between the labels and the CQI transmission cycles). The identification information receiving section 104 receives the identification information of the free space from the base station 20 by the HS-SCCH. The CQI transmitting section 106 transmits the CQI to the base station 20 at the transmission cycle associated with this free space by referring to the mobile station CQI transmission cycle registering section 102.

Figure 6:
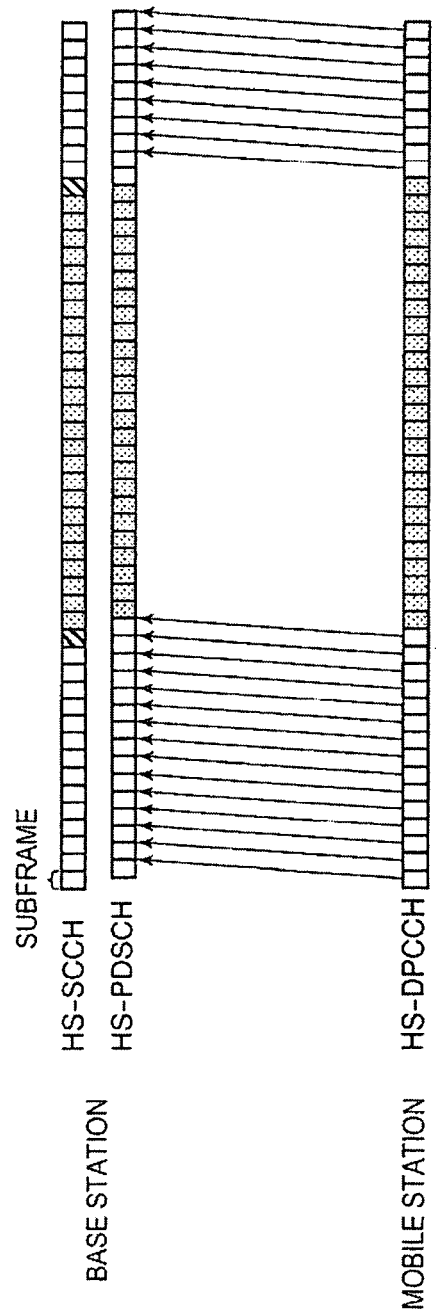
FIG. 6 is a view showing a transmission status of each channel in the W-CDMA communication system shown in FIG. 2.

In this case, as shown in FIG. 6, in a subframe of the HS-SCCH shown with diagonal lines immediately before the transmission by the HS-SCCH and the HS-PDSCH is stopped, the identification information transmitting section 204 of the base station 20 transmits the identification information with the code group "111" and the code offset "0000", which indicates the free space of the label "1" in order to set up 0 milliseconds as the transmission cycle of the CQI. The identification information receiving section 104 of the mobile station 10 receives this identification information. The CQI transmitting section 106 of the mobile station 10 refers to the mobile station CQI transmission cycle registering section 102 from this identification information, and transmits the CQI to the base station 20 at the transmission cycle associated with this free space. In this case, inasmuch as the transmission cycle of the CQI is 0 milliseconds, the CQI transmitting section 106 does not transmit the CQI.

Further, in a subframe of the HS-SCCH shown with diagonal lines immediately before transmission by the HS-SCCH and the HS-PDSCH is restarted, the identification information transmitting section 204 of the base station 20 transmits the identification information with the code group "111" and the code offset "0001", which indicates the free space of the label "2", in order to set up two milliseconds as the transmission cycle of the CQI. The identification information receiving section 104 of the mobile station 10 receives this identification information. The CQI transmitting section 106 of the mobile station 10 refers to the mobile station CQI transmission cycle registering section 102 from this identification information, and transmits the CQI to the base station 20 at the transmission cycle associated with this free space. In this case, inasmuch as the transmission cycle of the CQI is two milliseconds, the CQI transmitting section 106 transmits the CQI at the transmission cycle of two milliseconds.

Thus, in subframes of the HS-DPCCH shown with halftone dot meshing of FIG. 6, inasmuch as the CQI is not mapped on the HS-DPCCH, the transmission by the HS-DPCCH is to be stopped.

As described above, according to the present embodiment, inasmuch as the mobile station 10 stops transmission by the HS-DPCCH in a period of time other than during reception of packet data by the HS-PDSCH, in which transmission of a CQI is not always necessary, it is possible to reduce a redundant process in which the CQI is continued to be transmitted.

Thus, it is possible to reduce transmission power of the HS-DPCCH by the mobile station 10, and it is possible to reduce interference into other propagation paths by stopping the transmission by the HS-DPCCH.

Further, inasmuch as the transmission cycle of the CQI is set up by the HS-SCCH from the base station 20 to the mobile station 10, it is possible to use a channel resource of the HS-SCCH effectively.

According to this configuration, the transmission cycle of the CQI can be set up by the HS-SCCH from the base station to the mobile station.

Therefore, inasmuch as transmission by the HS-DPCCH can be stopped for a mobile station in a period of time other than during reception of packet data by the HS-PDSCH, in which transmission of a CQI is not always necessary, it is possible to reduce a redundant process in which the mobile station continues to transmit the CQI.

Thus, it is possible to reduce transmission power of the HS-DPCCH by the mobile station, and it is possible to reduce interference into other propagation paths by stopping the transmission by the HS-DPCCH.

Further, inasmuch as the transmission cycle of the CQI is set up by the HS-SCCH, it is possible to use a channel resource of the HS-SCCH effectively.

Moreover, in the embodiment of the present invention, the mobile station 10 can adjust the transmission cycle of the CQI set up by the base station 20 in accordance with a state of the mobile station 10.

Hereinafter, a configuration and an operation of the mobile station 10 will be described in detail.

Figure 7:
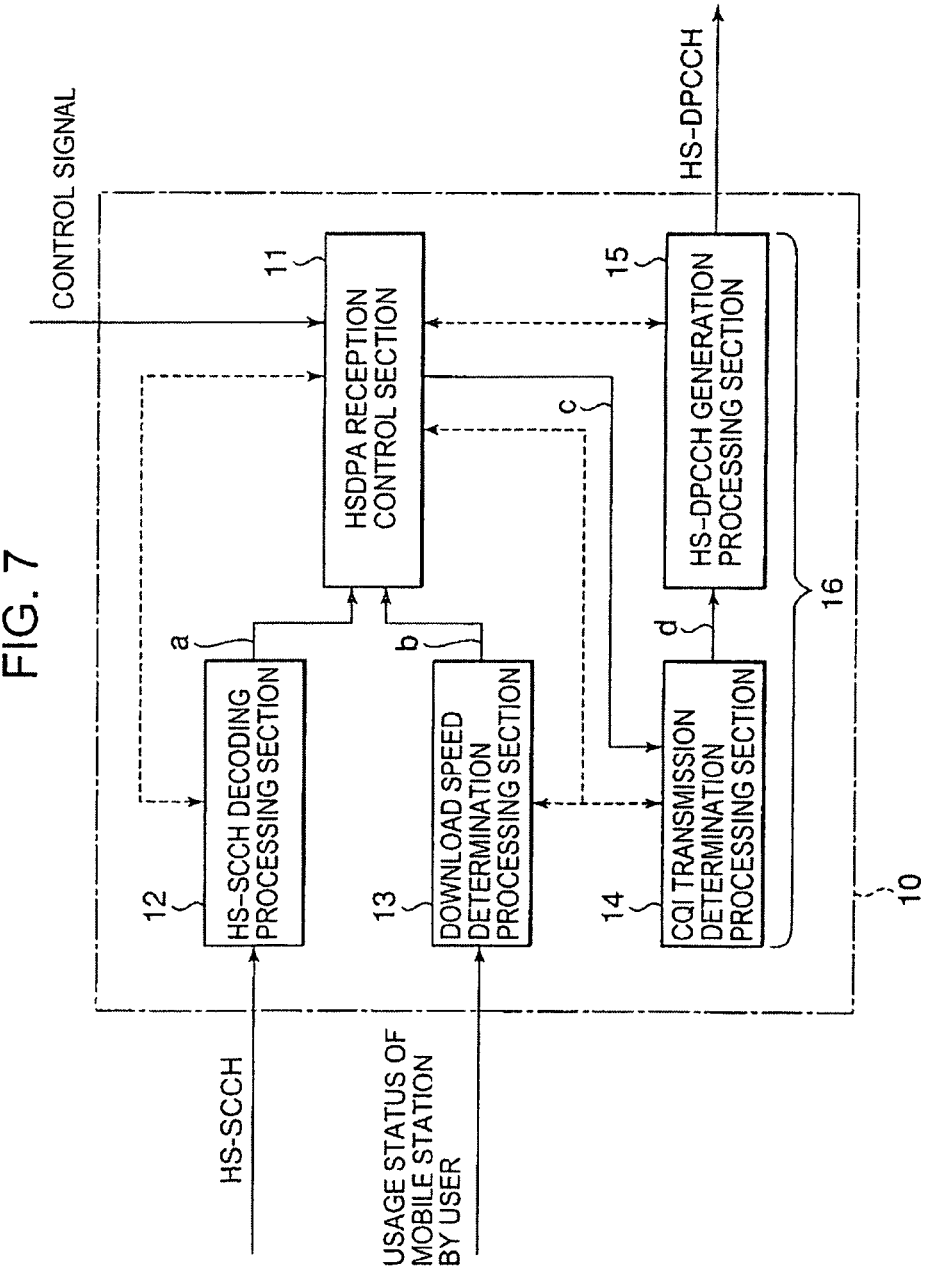
FIG. 7 is a block diagram showing one configuration example of the mobile station shown in FIG. 2.

As shown in FIG. 7, the mobile station 10 comprises an HSDPA reception control section 11, an HS-SCCH decoding processing section 12, a download speed determination processing section 13, a CQI transmission determination processing section 14, and an HS-DPCCH generation processing section 15.

In this regard, in FIG. 7, only constituent elements for carrying out a process from reception of notification of a transmission cycle of a CQI by the HS-SCCH to transmission of the CQI are shown, but constituent elements for carrying out a process of packet data received by the HS-PDSCH are omitted.

Further, the CQI transmitting section 16 is constructed by the CQI transmission determination processing section 14 and the HS-DPCCH generation processing section 15. This CQI transmitting section 16 corresponds to the CQI transmitting section 106 of FIG. 5.

Figure 8:
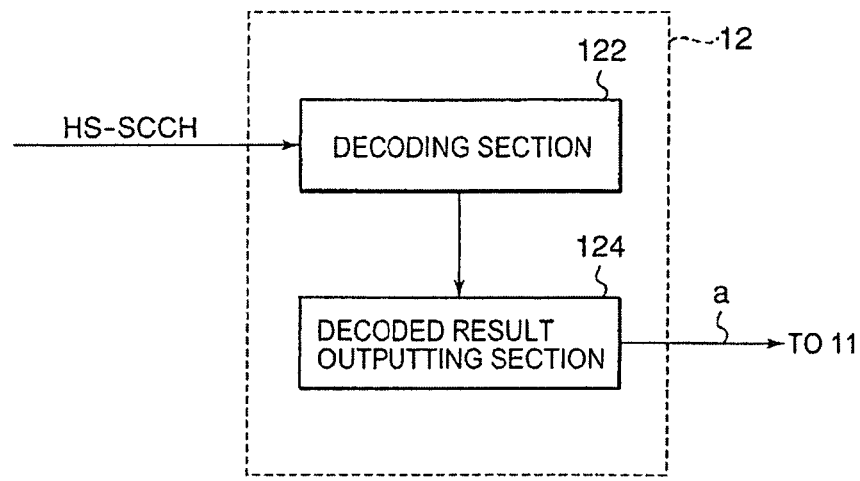
FIG. 8 is a block diagram showing one configuration example of an HS-SCCH decoding processing section used in the mobile station shown in FIG. 7.

Referring to FIG. 8, the HS-SCCH decoding processing section 12 comprises a decoding section 122 and a decoded result outputting section 124. The decoding section 122 decodes the control information received by the HS-SCCH. The decoded result outputting section 124 outputs the decoded result a to the HSDPA reception control section 11. This HS-SCCH decoding processing section 12 corresponds to the identification information receiving section 104 of FIG. 5.

Figure 9:
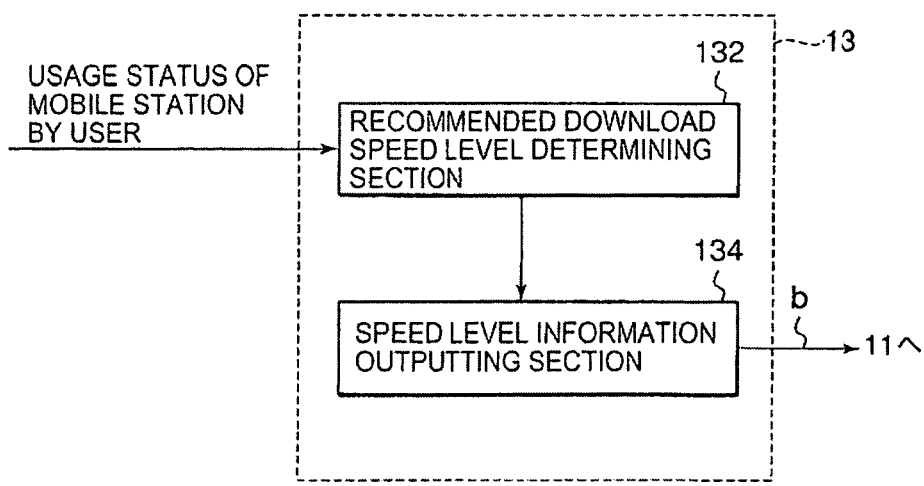
FIG. 9 is a block diagram showing one configuration example of a download speed determination processing section used in the mobile station shown in FIG. 7.

Referring to FIG. 9, the download speed determination processing section 13 comprises a recommended download speed level determining section 132 and a speed level information outputting section 134. The recommended download speed level determining section 132 determines a recommended download speed level when to download packet data from the base station 20 by the HS-PDSCH on the basis of inputted information on a usage status of a mobile station by a user. The speed level information outputting section 134 outputs information b on the determined recommended download speed level to the HSDPA reception control section 11.

The HSDPA reception control section 11 controls the HS-SCCH decoding processing section 12, the download speed determination processing section 13, the CQI transmission determination processing section 14, and the HS-DPCCH generation processing section 15 on the basis of control signals from the outside. In this regard, the HSDPA reception control section 11 can provide parameters necessary for an operation of each of the processing sections, and can also control activation, stop, and initialization of each of the processing sections.

Figure 10:
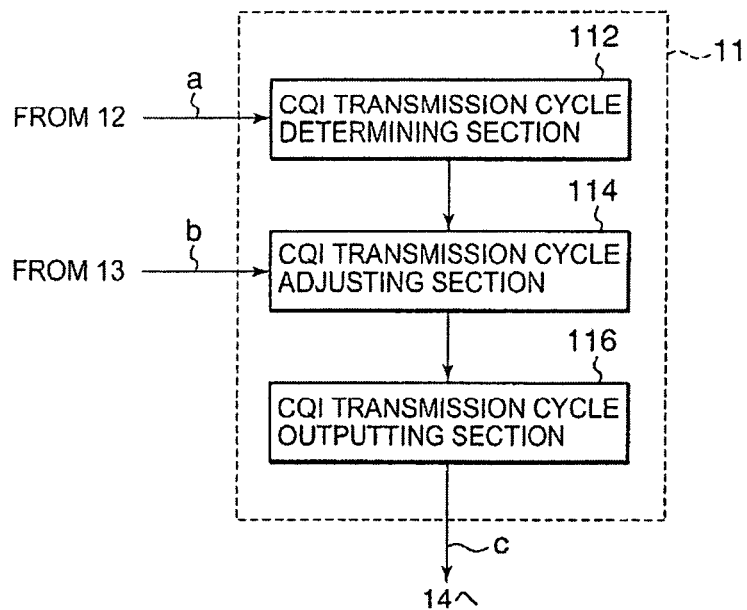
FIG. 10 is a block diagram showing one configuration example of an HSDPA reception control section used in the mobile station shown in FIG. 7.

Referring to FIG. 10, the HSDPA reception control section 11 comprises a CQI transmission cycle determining section 112, a CQI transmission cycle adjusting section 114, and a CQI transmission cycle outputting section 116. The CQI transmission cycle determining section 112 determines a transmission cycle of the CQI set up by the base station 20 on the basis of the decoded result a of the control information from the HS-SCCH decoding processing section 12. The CQI transmission cycle adjusting section 114 adjusts the transmission cycle of the CQI set up by the base station 20 on the basis of the information b on the recommended download speed level from the download speed determination processing section 13. The CQI transmission cycle outputting section 116 outputs information c on the adjusted transmission cycle of the CQI to the CQI transmission determination processing section 14.

Figure 11:
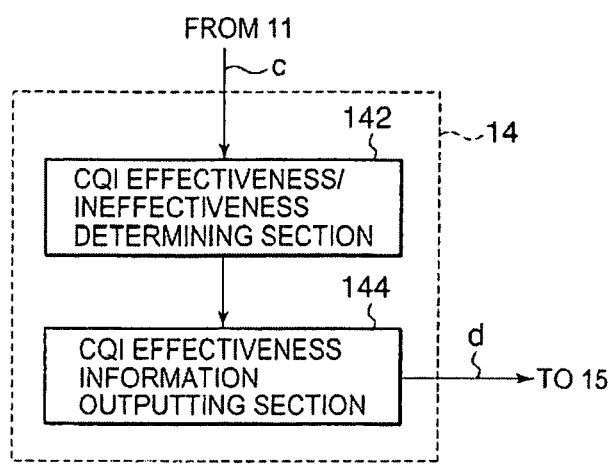
FIG. 11 is a block diagram showing one configuration example of a CQI transmission processing section used in the mobile station shown in FIG. 7.

Referring to FIG. 11, the CQI transmission determination processing section 14 comprises a CQI effectiveness/ineffectiveness determining section 142 and a CQI effectiveness information outputting section 144. The CQI effectiveness/ineffectiveness determining section 142 determines for every subframe whether a CQI to be mapped on the HS-DPCCH is set to effectiveness or not on the basis of the information c on the transmission cycle of the CQI from the HSDPA reception control section 11. The CQI effectiveness information outputting section 144 outputs information d on the determined CQI effectiveness to the HS-DPCCH generation processing section 15.

Figure 12:
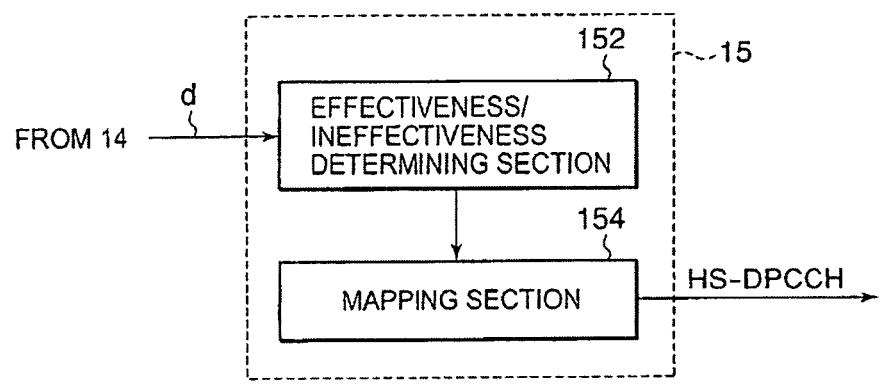
FIG. 12 is a block diagram showing one configuration example of an HS-DPCCH generation processing section used in the mobile station shown in FIG. 7.

Referring to FIG. 12, the HS-DPCCH generation processing section 15 comprises an effectiveness/ineffectiveness determining section 152 and a mapping section 154. The effectiveness/ineffectiveness determining section 152 determines for every subframe whether the information d of the CQI effectiveness from the CQI transmission determination processing section 14 indicates effective or not. In the case where the information d on the CQI effectiveness indicates effective, the mapping section 154 maps the CQI on the HS-DPCCH.

Figure 13:
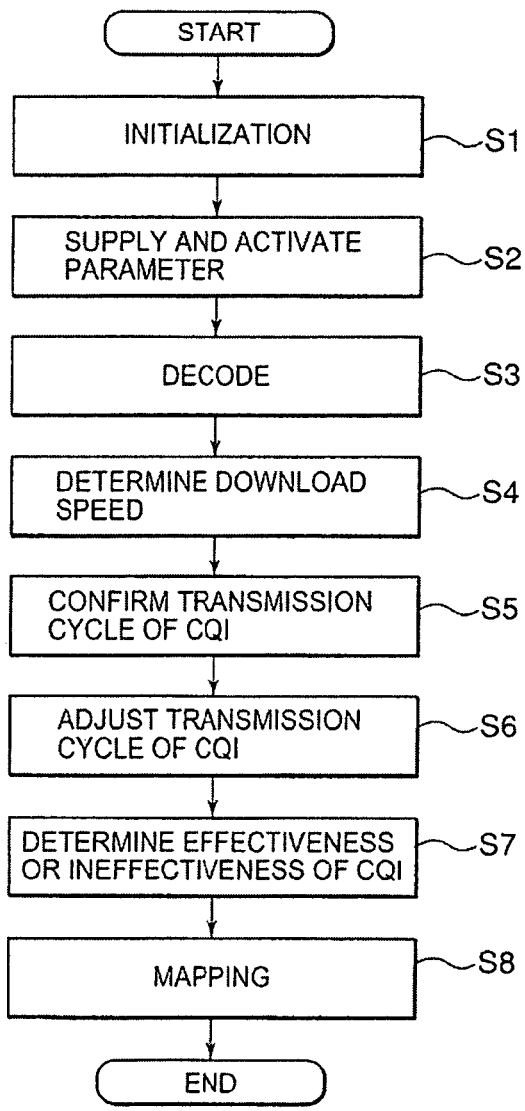
FIG. 13 is a flowchart for explaining an operation of the mobile station shown in FIG. 7.

Hereinafter, an operation of the mobile station 10 shown in FIG. 7 will be described with reference to FIG. 13.

(a) Initialization Process

The HSDPA reception control section 11 first initializes the HS-SCCH decoding processing section 12, the download speed determination processing section 13, the CQI transmission determination processing section 14 and the HS-DPCCH generation processing section 15 when to start communication of HSDPA (Step S1).

(b) Parameter Supplying and Activating Process

Next, the HSDPA reception control section 11 supplies parameters necessary for the operations to the HS-SCCH decoding processing section 12, the download speed determination processing section 13, the CQI transmission determination processing section 14 and the HS-DPCCH generation processing section 15, and activates each of the processing sections at the appropriate timing (Step S2).

(c) Decode Process

In the HS-SCCH decoding processing section 12, the decoding section 122 decodes the control information received by the HS-SCCH, and the decoded result outputting section 124 outputs the decoded result a to the HSDPA reception control section 11. This process is periodically repeated in a subframe unit.

(d) Download Speed Determining Process

In the download speed determination processing section 13, the recommended download speed level determining section 132 determines a recommended download speed level when to download packet data from the base station 20 by the HS-PDSCH on the basis of information on a usage status of the mobile station by the user, and the speed level information outputting section 134 outputs the information b on the determined recommended download speed level to the HSDPA reception control section 11. This process is periodically repeated in a subframe unit.

In the present embodiment, as shown in Table 1, it will be assumed that information on a usage status of a mobile station by a user can be set up, and a recommended download speed level can be set up in accordance with the information on the usage status of the mobile station.

In this regard, in Table 1, it is assumed that the mobile station 10 has a folding shape. Further, for example, although there is the case where a different recommended download speed level is set up depending on the usage status of the mobile station 10 (for example, the case where the mobile station 10 is connected to a USB with a closed state), it is to be changed which is adopted in such a case depending on initial setting.

TABLE 1

| Information on usage status of mobile station by user | Recommended download speed level |
|---|---|
| state where a USB is connected to the mobile station 10 | high speed |
| state where the mobile station 10 is opened | high speed |
| state where the mobile station 10 is closed | medium speed |
| state where a battery charger is connected to the mobile station 10 | low speed |

(e) CQI Transmission Cycle Confirming Process

In the HSDPA reception control section 11, when the decoded result a of the control information is inputted from the HS-SCCH decoding processing section 12, the CQI transmission cycle determining section 112 determines whether a channelization code is one for a free space or not on the basis of the control information.

Here, in the case where the channelization code is not one for a free space, the CQI transmission cycle determining section 112 of the HSDPA reception control section 11 outputs the decoded result of the control information to the HS-PDSCH decoding processing section (not shown in the drawings).

On the other hand, in the case where the channelization code is one for a free space, the CQI transmission cycle determining section 112 of the HSDPA reception control section 11 determines which of the labels 1 to 8 preliminarily assigned the free space corresponds to, and confirms the transmission cycle of the CQI associated with the determined label (Step S5). In the present embodiment, transmission cycles of the CQI as shown in Table 2 are associated with the labels 1 to 8, respectively.

TABLE 2

| Label | CQI reporting cycle |
|---|---|
| 1 | 0 milliseconds |
| 2 | 2 milliseconds |
| 3 | 4 millisecond |
| 4 | 8 millisecond |
| 5 | 10 milliseconds |
| 6 | 20 milliseconds |
| 7 | 80 milliseconds |
| 8 | 160 milliseconds |

In this regard, the above Table 2 is preliminarily registered in the mobile station CQI transmission cycle registering section 102 shown in FIG. 5, and the CQI transmission cycle determining section 112 includes this mobile station CQI transmission cycle registering section 102.

(f) CQI Transmission Cycle Adjusting Process

In the HSDPA reception control section 11, after confirming the transmission cycle of the CQI set up by the base station 20, the CQI transmission cycle adjusting section 114 adjusts the transmission cycle of the CQI set up by the base station 20 on the basis of the information b on the recommended download speed level from the download speed determination processing section 13, and the CQI transmission cycle outputting section 116 outputs the information c on the adjusted transmission cycle of the CQI to the CQI transmission determination processing section 14 (Step S6).

Here, in the case where the recommended download speed level indicates high speed, the CQI transmission cycle adjusting section 114 of the HSDPA reception control section 11 makes the transmission cycle of the CQI shorter. In the case where the recommended download speed level indicates medium speed, it holds the transmission cycle of the CQI as it is. In the case where the recommended download speed level indicates low speed, it makes the transmission cycle of the CQI longer. It is to be changed how long or short the transmission cycle of the CQI is made depending on the initial setting.

(g) CQI Effectiveness/Ineffectiveness Determining Process

In the CQI transmission determination processing section 14, the CQI effectiveness/ineffectiveness determining section 142 determines for every subframe whether a CQI to be mapped on the HS-DPCCH is made effective or not on the basis of the information c on the transmission cycle of the CQI set as an initial value by the HSDPA reception control section 11 immediately after activation, and the CQI effectiveness information outputting section 144 outputs the information d on the determined CQI effectiveness to the HS-DPCCH generation processing section 15 (Step S7). This process is periodically repeated in a subframe unit.

Further, in the CQI transmission determination processing section 14, when information c on a new transmission cycle of the CQI is inputted from the HSDPA reception control section 11, the CQI effectiveness/ineffectiveness determining section 142 determines for every subframe whether the CQI to be mapped on the HS-DPCCH is made effective or not on the basis of the information c on a new transmission cycle of the CQI, and the CQI effectiveness information outputting section 144 outputs the information d on the determined CQI effectiveness to the HS-DPCCH generation processing section 15 (Step S7). This process is periodically repeated in a subframe unit.

(h) Mapping Process

In the HS-DPCCH generation processing section 15, the effectiveness/ineffectiveness determining section 152 determines for every subframe whether the information d on the CQI effectiveness from the CQI transmission determination processing section 14 indicates effective or not, and the mapping section 154 maps the CQI on the HS-DPCCH in the case where the information d on the CQI effectiveness indicates effective (Step S8). This process is periodically repeated in a subframe unit.

As described above, in the present embodiment, the mobile station 10 determines recommended download speed in accordance with a status of use of a mobile station by a user, and adjusts a transmission cycle of the CQI set up in the base station 20 in accordance with the recommended download speed.

Thus, inasmuch as the mobile station 10 can flexibly change the transmission cycle of the CQI during HS-PDSCH reception in accordance with the recommended download speed, the download speed can be changed at the initiative of the mobile station 10 due to real-time need of an HSDPA packet.

As described above, according to the present invention, there is an effect as follows as an example. Inasmuch as a mobile station can stop transmission of a CQI that is not necessary at the reception of packet data by the HS-PDSCH, an effect can be obtained that it is possible to reduce transmission power of the HS-DPCCH by the mobile station, and that it is possible to reduce interference into other propagation paths by stopping the transmission of the HS-DPCCH.

Although the embodiment of the present invention has been explained as described above, the present invention is not limited to the embodiment described above, of course. For example, in the present embodiment, in the case where it is notified from the base station 20 that a reporting cycle of the CQI is 0 milliseconds, a report of the CQI is completely stopped. However, in the present invention, not only a report of the CQI but also a report of the ACK (Acknowledgment) and NACK (Negative Acknowledgment) may be stopped. Further, in the present embodiment, although a connection status or an open/close status of the mobile station 10 has been used as a tool for determining a status of use of a mobile station by a user, a fee structure signed by the user, a remaining battery level when a battery charger is not connected to the mobile station 10, or the like may be used in the present invention.

This application is the National Phase of PCT/JP2007/067239, filed Aug. 29, 2007, which is based upon and claims the benefit of priority from Japanese patent application No. 2006-235687, filed Aug. 31, 2006, the disclosure of which is incorporated herein in its entirety by reference.

What is claimed is:

1. A W-CDMA (Wide band Code Division Multiple Access) communication system comprising a base station and a mobile station, the mobile station transmitting a CQI (Channel Quality Indicator) to the base station at a transmission cycle set up by the base station, wherein the base station comprises:

a base station CQI transmission cycle registering section for preliminarily registering eight transmission cycles of the CQI associated with eight free spaces, respectively, a channelization code being not defined for each of the free spaces in a channelization code set of an HS-SCCH (High Speed Shared Control Channel); and an identification information transmitting section for transmitting, in the case of setting of a specific transmission cycle for the CQI that is selected from the eight transmission cycles, identification information of a specific free space associated with the specific transmission cycle to be set up to the mobile station by the HS-SCCH by referring to the base station CQI transmission cycle registering section, and wherein the mobile station comprises:

a mobile station CQI transmission cycle registering section for preliminarily registering eight transmission cycles of the CQI associated with eight free spaces, respectively, a channelization code being not defined for each of the eight free spaces in the channelization code set of the HS-SCCH;

an identification information receiving section for receiving the identification information of the specific free space from the base station by the HS-SCCH; and a CQI transmitting section for transmitting the CQI to the base station at the specific transmission cycle associated with the specific free space by referring to the mobile station CQI transmission cycle registering section from the identification information on the specific free space.

2. The W-CDMA communication system as claimed in claim 1, wherein, in the case where transmission of packet data by an HS-PDSCH (High Speed Physical Downlink Shared Channel) is to be stopped, the identification information transmitting section of the base station transmits identification information of the specific free space associated with the specific transmission cycle "0" of the CQI to the mobile station by the HS-SCCH immediately before the transmission of packet data by the HS-PDSCH is to be stopped.

3. The W-CDMA communication system as claimed in claim 1, wherein the mobile station further comprises:

a download speed determination processing section for determining download speed on downloading of packet data from the base station by an HS-PDSCH (High Speed Physical Downlink Shared Channel) on the basis of a usage status of the mobile station; and a reception control section for determining that the specific transmission cycle of the CQI associated with the specific free space is the transmission cycle of the CQI set up by the base station on the basis of the identification information of the specific free space received from the base station by the HS-SCCH, and for adjusting the transmission cycle of the CQI set up by the base station on the basis of the download speed determined by the download speed determination processing section, and wherein the CQI transmitting section maps the CQI on an HS-DPCCH (High Speed Dedicated Physical Control Channel) at the transmission cycle of the CQI adjusted by the reception control section to transmit it to the base station.

4. A base station used in a W-CDMA (Wide band Code Division Multiple Access) communication system, the base station receiving a CQI (Channel Quality Indicator) from a mobile station at a transmission cycle set up by the base station, the base station comprising:

a CQI transmission cycle registering section for preliminarily registering eight transmission cycles of the CQI associated with eight free spaces, respectively, a channelization code being not defined for each of the free spaces in a channelization code set of an HS-SCCH (High Speed Shared Control Channel); and an identification information transmitting section for transmitting, in the case of setting of a specific transmission cycle for the CQI that is selected from the eight transmission cycles, identification information of the a specific free space associated with the specific transmission cycle to be set up to the mobile station by the HS-SCCH by referring to the CQI transmission cycle registering section.

5. The base station as claimed in claim 4, wherein, in the case where transmission of packet data by an HS-PDSCH (High Speed Physical Downlink Shared Channel) is to be stopped, the identification information transmitting section transmits identification information of the specific free space associated with the specific transmission cycle "0" of the CQI to the mobile station by the HS-SCCH immediately before the transmission of packet data by the HS-PDSCH is to be stopped.

6. A mobile station used in a W-CDMA (Wide band Code Division Multiple Access) communication system including a base station, the mobile station transmitting a CQI (Channel Quality Indicator) to the base station at a transmission cycle set up by the base station, the mobile station comprising:

a CQI transmission cycle registering section for preliminarily registering eight transmission cycles of the CQI associated with eight free space spaces, respectively, a channelization code being not defined for each of the eight free spaces in a channelization code set of an HS-SCCH;

an identification information receiving section for receiving identification information of the a specific free space from the base station by the HS-SCCH that is selected from the eight transmission cycles; and a CQI transmitting section for transmitting the CQI to the base station at the specific transmission cycle associated with the specific free space by referring to the CQI transmission cycle registering section from the identification information of the specific free space.

7. The mobile station as claimed in claim 6, further comprising:

a download speed determination processing section for determining download speed on downloading of packet data from the base station by an HS-PDSCH (High Speed Physical Downlink Shared Channel) on the basis of a usage status of the mobile station; and a reception control section for determining that the specific transmission cycle of the CQI associated with the specific free space is the transmission cycle of the CQI set up by the base station on the basis of the identification information of the specific free space received from the base station by the HS-SCCH, and for adjusting the transmission cycle of the CQI set up by the base station on the basis of the download speed determined by the download speed determination processing section, and wherein the CQI transmitting section maps the CQI on an HS-DPCCH (High Speed Dedicated Physical Control Channel) at the transmission cycle of the CQI adjusted by the reception control section to transmit it to the base station.

8. The mobile station as claimed in claim 7, wherein the download speed determination processing section comprises:

a recommended download speed level determining section for determining a recommended download speed level on downloading of the packet data from the base station by the HS-PDSCH on the basis of a usage status of the mobile station; and a speed level information outputting section for outputting information on the determined recommended download speed level to the reception control section.

9. The mobile station as claimed in claim 8, wherein the identification information receiving section comprises a HS-SCCH decoding processing section for decoding control information received by the HS-SCCH and for outputting a decoded result thereof to the reception control section.

10. The mobile station as claimed in claim 9, wherein the reception control section comprises:
 a CQI transmission cycle determining section for determining a transmission cycle of the CQI set up by the base station on the basis of the decoded result of the control information from the HS-SCCH decoding processing section;
 a CQI transmission cycle adjusting section for adjusting the transmission cycle of the CQI set up by the base station on the basis of the information on the recommended download speed level from the download speed determination processing section; and
 a CQI transmission cycle outputting section for outputting information on the adjusted transmission cycle of the CQI to the CQI transmitting section.

11. The mobile station as claimed in claim 10, wherein the CQI transmitting section comprises:
 a CQI transmission determination processing section for determining for every subframe whether the CQI to be mapped on the HS-DPCCH should be effective or not on the basis of the information on the transmission cycle of the CQI from the reception control section and for producing information on the determined CQI effectiveness; and
 a HS-DPCCH generation processing section for determining for every subframe whether the information on the CQI effectiveness indicates effective or not and for mapping the CQI on the HS-DPCCH in the case where it indicates effective.

12. A method of controlling a CQI transmission cycle in a W-CDMA (Wide band Code Division Multiple Access) communication system, the W-CDMA communication system comprising a base station and a mobile station, the mobile station transmitting a CQI (Channel Quality Indicator) to the base station at a transmission cycle set up by the base station, wherein the method comprises:
 a registering step, in the base station and the mobile station, of preliminarily registering eight transmission cycles of a CQI associated with eight free spaces, respectively, a channelization code being not defined for each of the eight free spaces in a channelization code set of an HS-SCCH (High Speed Shared Control Channel);
 a CQI transmission cycle setting step, in the base station, of transmitting, in the case of setting of a specific transmission cycle for the CQI that is selected from the eight transmission cycles, identification information of the a specific free space associated with the specific transmission cycle to be set up to the mobile station by the HS-SCCH; and
 a CQI transmission step, in the mobile station, of transmitting, when the identification information of the specific free space is received from the base station by the HS-SCCH, the CQI to the base station at the specific transmission cycle associated with the specific free space.

13. The method as claimed in claim 12, wherein the CQI transmission cycle setting step transmits, in the case where transmission of packet data by an HS-PDSCH (High Speed Physical Downlink Shared Channel) is to be stopped, identification information of the specific free space associated with the specific transmission cycle "0" of the CQI to the mobile station by the HS-SCCH immediately before the transmission of packet data by the HS-PDSCH is to be stopped.

14. The method as claimed in claim 12, wherein the method further comprises:
 a step, in the mobile station, of determining download speed on downloading of packet data from the base station by an HS-PDSCH (High Speed Physical Downlink Shared Channel) on the basis of a usage status of the mobile station;
 a step, in the mobile station, of determining that the specific transmission cycle of the CQI associated with the specific free space is the transmission cycle of the CQI set up by the base station on the basis of the identification information of the specific free space received from the base station by the HS-SCCH, and of adjusting the transmission cycle of the CQI set up by the base station on the basis of the determined download speed; and
 a step, in the mobile station, of mapping the CQI on an HS-DPCCH (High Speed Dedicated Physical Control Channel) at the adjusted transmission cycle of the CQI and of transmitting it to the base station.

* * * * *